US008063321B2

(12) United States Patent
Wineland et al.

(10) Patent No.: US 8,063,321 B2
(45) Date of Patent: Nov. 22, 2011

(54) UNIVERSAL BELT SCALE FRAME

(75) Inventors: Gary William Wineland, Roaring Spring, PA (US); Tim E. Wolf, Pella, IA (US)

(73) Assignee: Precision, Inc., Pella, IA (US)

( * ) Notice: Subject to any disclaimer, the term of this patent is extended or adjusted under 35 U.S.C. 154(b) by 231 days.

(21) Appl. No.: 12/393,791

(22) Filed: Feb. 26, 2009

(65) Prior Publication Data
US 2010/0288565 A1    Nov. 18, 2010

Related U.S. Application Data

(60) Provisional application No. 61/067,255, filed on Feb. 26, 2008.

(51) Int. Cl.
G01G 19/00    (2006.01)
G01G 21/28    (2006.01)

(52) U.S. Cl. .......................... 177/126; 177/119
(58) Field of Classification Search ............... 177/16, 177/126, 119, 145
See application file for complete search history.

(56) References Cited

U.S. PATENT DOCUMENTS

| | | | |
|---|---|---|---|
| 2,918,269 A | 12/1959 | Williams, Jr. | |
| 3,115,201 A | 12/1963 | Brumbaugh | |
| 3,561,553 A | 2/1971 | Blubaugh | |
| 3,603,416 A * | 9/1971 | Spurlin ........................ | 177/1 |
| 3,638,743 A | 2/1972 | Douglas | |
| 3,656,337 A | 4/1972 | McDonald | |
| 3,785,447 A | 1/1974 | Blackerby | |
| 4,260,034 A | 4/1981 | Randolph, Jr. | |
| 4,463,816 A | 8/1984 | MacFarlane | |
| 4,480,705 A | 11/1984 | Raske et al. | |
| 4,619,359 A | 10/1986 | Kennedy, Jr. et al. | |
| 4,682,664 A * | 7/1987 | Kemp ........................... | 177/16 |
| 5,111,896 A * | 5/1992 | Porcari et al. ................ | 177/16 |
| 5,294,756 A | 3/1994 | Lauber et al. | |
| 5,338,901 A | 8/1994 | Dietrich | |
| 5,561,274 A | 10/1996 | Brandorff | |
| 5,670,752 A * | 9/1997 | Nakajima .................... | 177/145 |
| 5,689,092 A | 11/1997 | Wurz et al. | |
| 5,866,855 A | 2/1999 | Nachtigal | |
| 6,252,181 B1 | 6/2001 | Fallas et al. | |
| 6,693,244 B2 * | 2/2004 | Johnson et al. .............. | 177/126 |
| 6,818,841 B1 | 11/2004 | McDonald | |
| 7,297,879 B2 | 11/2007 | Salomon | |
| 7,331,210 B2 | 2/2008 | Dietrich | |
| 2002/0144844 A1 | 10/2002 | Nachtigal et al. | |
| 2005/0205307 A1 | 9/2005 | Salomon | |
| 2006/0289277 A1 | 12/2006 | Berger et al. | |
| 2007/0215391 A1 | 9/2007 | Wineland | |
| 2010/0170724 A1 * | 7/2010 | Yuan ............................ | 177/145 |

* cited by examiner

Primary Examiner — Randy W Gibson
(74) Attorney, Agent, or Firm — BrownWinick Law Firm

(57) ABSTRACT

A weighing apparatus adapted for use in an existing conveyor, and a method for attaching a weighing apparatus to an existing conveyor without removing components or modifying the conveyor. The apparatus comprises a roller, a load cell, a vertical support and a cross member. The cross member is secured to adjacent existing idlers or alternatively to the frame supporting the existing conveyor via non-invasive means that do not require the existing conveyor or components to be removed or modified by cutting, drilling or welding. The roller is capable of precise adjustment both horizontally and vertically relative to the conveyor to ensure levelness and accuracy without the use of tools.

20 Claims, 5 Drawing Sheets

UNIVERSAL BELT SCALE FRAME

CROSS-REFERENCE TO RELATED APPLICATIONS

This application claims the benefit of U.S. Provisional Application No. 61/067,255, filed on Feb. 26, 2008.

BACKGROUND OF THE INVENTION

1. Field of the Invention

The present invention relates generally to a mechanical/electrical belt scale frame used on belt conveyors for the purpose of monitoring the amount of material that is delivered by the conveyor.

2. Description of the Prior Art

It can be appreciated that belt scales have been used for many years for the purpose of recording and monitoring the amount of material that goes across a conveyor. Typically, these belt scale frames have been manufactured in many different configurations to incorporate existing idlers on the conveyor or to use a supplied idler. The weight detecting electrical sensor, referred to as a load cell or strain gauge, was also attached to the belt scale frame in many different ways. Some frames even incorporated linear variable differential transformers (LVDT) instead of load cells. In all previous belt scale frames, it was necessary to attach these frames directly to the main conveyor frame where the existing conveyor idlers were also attached.

The main problem with a conventional belt scale frame is that its installation would require existing conveyor idlers to be removed and/or modified by cutting, drilling or welding. More than that, in a conventional belt scale frame with a supplied idler, an existing conveyor idler would still have to be removed. Another problem with the current belt scale frames is that once the frame is installed on the conveyor, it would be necessary to shim the existing idlers before and after the scale frame so as to make all the idlers level with one another. Still another problem is the time it takes to actually install a belt scale frame, let alone move the belt scale frame from one conveyor to another.

While all of these devices and circumstances of mounting may be suitable for the particular purpose to which they are applied, they are not as convenient as the present invention. There are many problems that arise when a conventional belt scale frame is to be installed. One problem is that a skilled person is required for cutting or welding an existing conveyor idler to be used on the belt scale frame. Another problem arises if holes need to be drilled in the conveyor frame for the belt scale frame. Yet another problem is removing existing idlers for the purpose of leveling.

Maintenance raises additional problems. For example, due to normal wear and tear, present frames would require removal of the idler. Furthermore, if the belt scale frame were to be removed from the conveyor, a new or used idler that was not modified would need to be re-installed where the belt scale frame had been. Another problem arises where cross supports on the conveyor may need to be removed so that the belt scale frame could set in. Finally, a problem arises if the conveyor on which a belt scale frame was to be installed had a continuous cover between the troughing and return side of the belt, such cover may have to be removed for the belt scale frame to fit.

In these respects, the present invention substantially departs from the conventional concepts and designs of the prior art, and in doing so provides a simpler belt scale apparatus and a simpler method of installing a belt scale on a conveyor.

SUMMARY OF THE INVENTION

In view of the foregoing disadvantages inherent in the known methods of installing belt scale frames, the present invention provides a simpler method of installation and a frame of universal design such that it will adapt to the many different widths of conveyors and also to the varying distances in idler spacing.

The general purpose of the present invention, which will be described subsequently in greater detail, is to provide a state of the art method of installing belt scale frames that will result in a new concept for weighing materials on belt conveyors which is not anticipated, rendered obvious, suggested or even implied by the prior art.

To obtain this, the present invention generally comprises a non-troughing flat conveyor roller (normally referred to as a return or flat roller), a load cell, a vertical roller support, a cross member, and necessary hardware for the purpose of attachment.

In this respect, before explaining at least one embodiment of the invention in detail, it is to be understood that the invention is not limited in application to the details of construction and to the arrangements of components set forth in the following description or illustrated in the drawings. The invention is capable of other embodiments and of being practiced and carried out in various ways. Also, it is to be understood that the phraseology and terminology employed herein are for the purpose of the description and should not be regarded as limiting.

A primary object of the present invention is to provide a belt scale frame system that will overcome the shortcomings of the prior art.

An object of the present invention is to provide ease of installation.

Another object is to provide installation that requires no tools.

Another object is to eliminate a need for personnel having welding or burning expertise.

Another object is to provide a system that can be retrofitted onto existing systems.

Another object is to provide a universal frame that is adaptable for any size of conveyor.

Another object is to provide a universal frame for any idler spacing.

Another object is to provide a belt scale frame with an integral speed sensing device.

Yet another object is to provide a belt scale frame that is adjustable for leveling.

Other features and advantages of the present invention will be readily appreciated from the following description. The description makes reference to the accompanying drawings, which are provided for illustration of the preferred embodiment. However, such embodiment does not represent the full scope of the invention. The subject matter which the inventor does regard as his invention is particularly pointed out and distinctly claimed in the claims at the conclusion of this specification.

DETAILED DESCRIPTION OF THE PREFERRED AND OTHER EMBODIMENTS

While the making and using of various embodiments of the present invention are discussed in detail below, it should be appreciated that the present invention provides for inventive concepts capable of being embodied in a variety of specific contexts. The specific embodiments discussed herein are merely illustrative of specific manners in which to make and use the invention and are not to be interpreted as limiting the scope of the instant invention.

Figure 1:
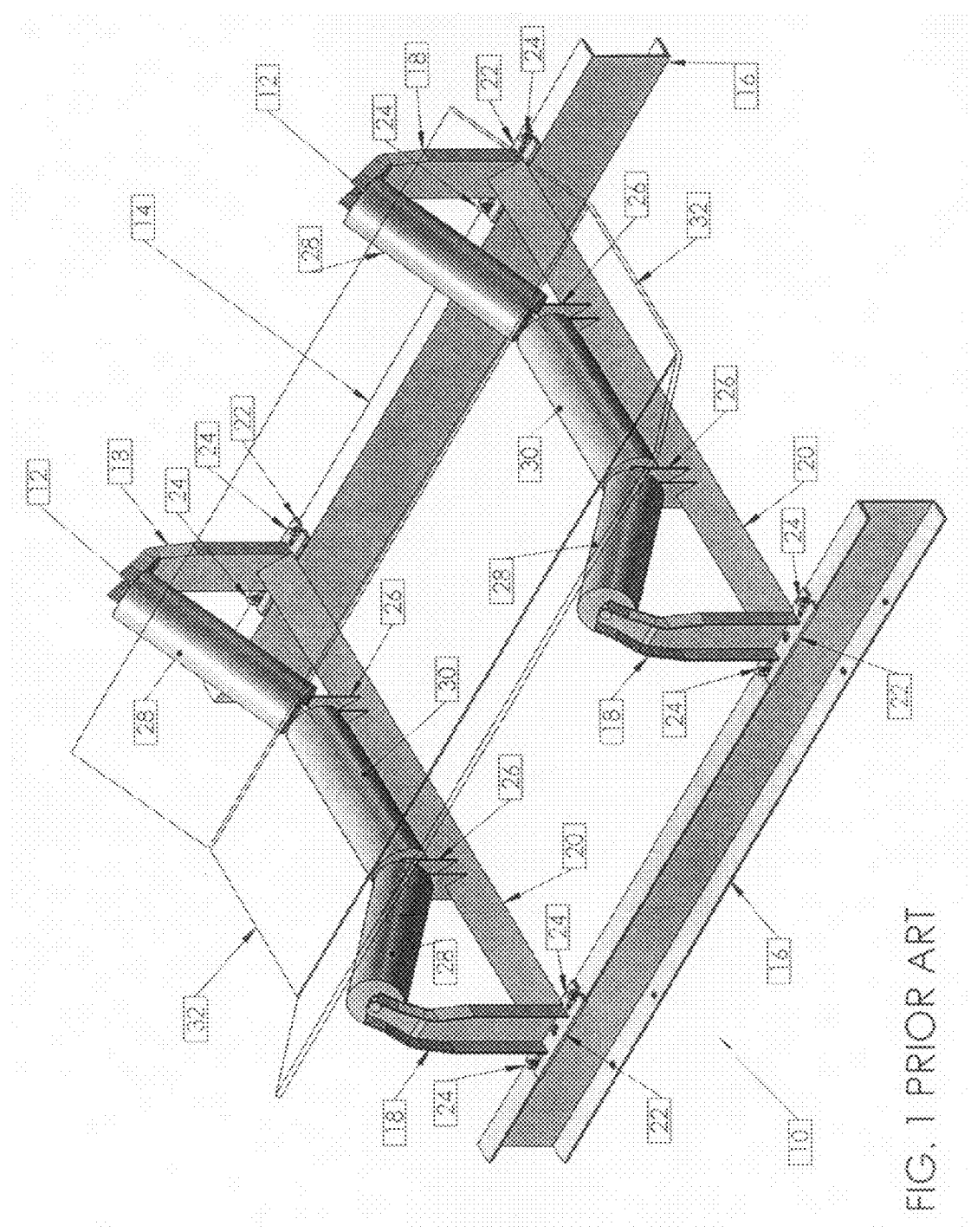
FIG. 1 is a perspective view of a partially cutaway, prior art conveyor.

Depicted in FIG. 1 is a portion of a conventional conveyor 10 comprising a plurality of idlers 12 spaced along a longitudinal frame 14. Frame 14 further comprises a pair of longitudinal frame rails 16. Each idler 12 comprises a pair of end brackets 18 secured to rail 16 at opposite ends of idler 12, and a transverse idler support 20 also secured at each end to rail 16 proximate end brackets 18. Each end bracket 18 is secured to rail 16 with foot pads 22, preferably via welding. Foot pad 22 is in turn preferably secured to rail 16 by one or more bolts 24. Idler 12 is also supported by one or more center brackets 26, which are in turn secured (e.g., by welding) to transverse idler support 20. End bracket 18 may also be welded to transverse idler support 20.

As shown, idler 12 comprises two wing rolls 28 situated on either side of, and angled upwardly from, a center roll 30. Wing rolls 28 and center roll 30 are separated by center brackets 26. While a troughing conveyor is shown, it will be appreciated that this arrangement may also be used in other types of conveyors. Running the length of conveyor 10 is a belt 32.

Figure 2:
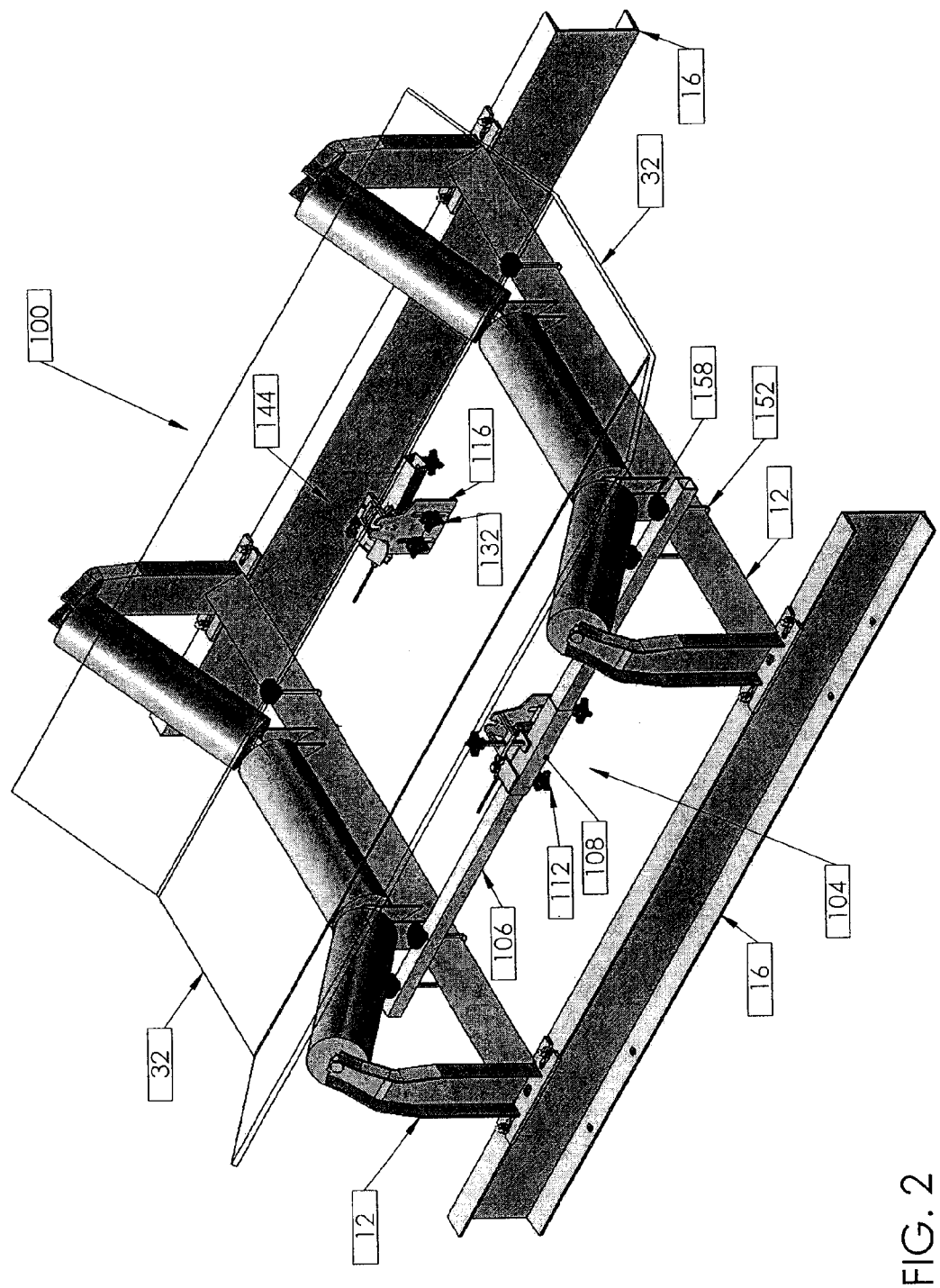
FIG. 2 is a perspective view of the partially cutaway conveyor of FIG. 1 fitted with the weighing apparatus disclosed herein.

Turning to FIG. 2, disposed between two adjacent idlers 12 is weighing apparatus 100. Weighing apparatus 100 may be situated between any two idlers in a conveyor system, but is preferably away from loading and off-loading locations in order to maximize stability of the belt 32 at the weighing location.

As shown in FIG. 2, weighing apparatus 100 comprises a flat roller 102, a pair of roller supports 104 at either end of roller 102, and a pair of cross members 106 that are substantially perpendicular to roller 102 and also to transverse idler supports 20. When installed, roller 102 is substantially parallel to idlers 12 and roughly coplanar with center roll 30 of idler 12. Cross members 106 are preferably square tubular but also may be c-shaped (with the open end facing the nearest frame rail 16), triangular tubular, I-beams or angles.

Figure 3:
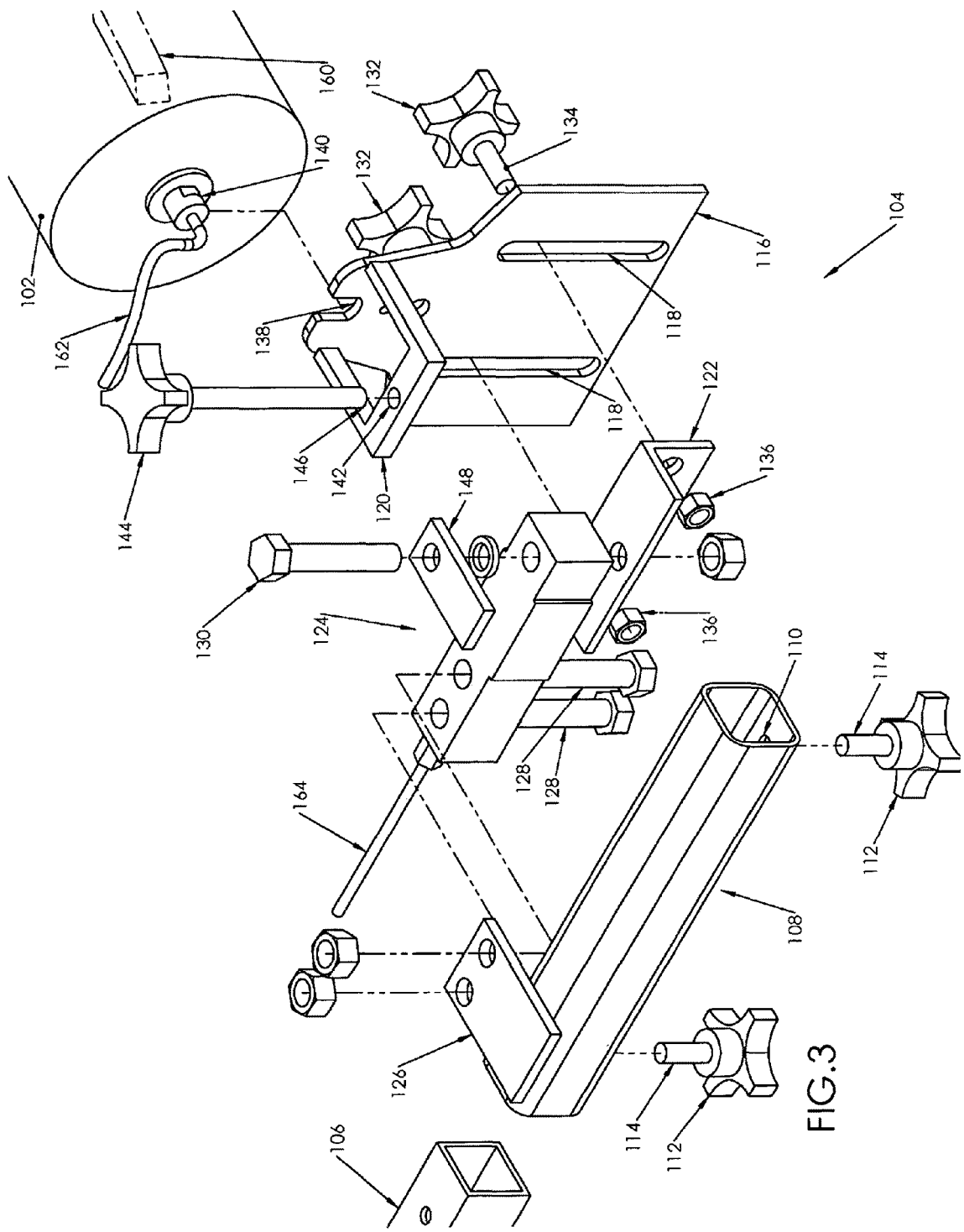
FIG. 3 is a partially exploded view of a portion of the weighing apparatus disclosed herein.

As shown in FIG. 2 and in exploded view in FIG. 3, roller supports 104 each define a sleeve 108 that slidably engages the exterior of cross member 106. The internal diameter or dimension of sleeve 108 is preferably only slightly larger than the external diameter or dimension of cross members 106. At least one surface of sleeve 108 features at least one internally threaded aperture 110. Inserted through aperture 110 is an externally threaded hand knob 112. End 114 of knob 112 frictionally engages cross member 106 inside sleeve 108 so as to retard or prevent the horizontal sliding movement of roller support 104 about cross member 106. Persons skilled in the art will appreciate that tightening hand knob 112 (e.g., by turning in a first direction) will engage or tighten the engagement with cross member 106, while loosening hand knob 112 (e.g., by turning in the opposite direction) will loosen or disengage hand knob from cross member 106. Attempting to horizontally adjust roller support 104 while one or more hand knobs 112 are either fully or partially tightened will result in immediate tactile feedback to the user about the condition of one or more knobs 112. It will be appreciated that when loosened, roller 102 may be freely horizontally adjusted about cross members 106 in the space that exists between adjacent idlers 12.

With reference again to FIGS. 2 and 3, roller supports 104 also comprise a vertical plate 116, at least one vertical slot 118 defined by the lower portion of plate 116, an upper bracket 120, a lower bracket 122, and a load cell 124. As used herein, "load cell" shall include load cells, beam strain gauges and other similar devices that are well known in the art. Load cell 124 is secured to tab 126 of sleeve 108 by one or more bolts 128 and to lower bracket 122 by bolt 130.

An externally threaded hand knob 132 passes through each slot 118 in vertical plate 116. End 134 of knob 132 threadedly engages internally threaded aperture 136 of lower bracket 122 so as to retard or prevent the vertical sliding movement of roller support 104 in relation to cross member 106. Aperture 136 may be integral with lower bracket 122 or may comprise an opening in lower bracket 122 having an internally threaded nut secured behind the opening, e.g. by welding. Again, it will be appreciated that tightening hand knob 132 (e.g., by turning in a first direction) will engage or tighten the engagement with lower bracket 122, while loosening hand knob 132 (e.g., by turning in the opposite direction) will loosen or disengage hand knob from lower bracket 122.

The top of vertical plate 116 also features a slot 138 adapted to receive a protruding shaft 140 of roller 102. Proximate slot 138 on vertical plate 116 is c-shaped upper bracket 120. Upper bracket 120 has an internally threaded aperture 142, through which an externally threaded hand knob 144 is inserted. End 146 of hand knob 144 frictionally engages, and rotates against, tab 148 of lower bracket 122. In the embodiment shown, tab 148 is secured to lower bracket 122 by bolt 130, which also passes through load cell 124.

Assuming that each hand knob 132 has been loosened as described above, it will be appreciated that by turning hand knob 144 in a first direction, vertical plate 116 and hence, roller 102, will move vertically upward in relation to roll support 104 and cross member 106, while turning hand knob 144 in the opposite direction will permit vertical plate 116 and roller 102 to move vertically downward in relation to roll support 104 and cross member 106, primarily by operation of gravity. This enables roller 102 to be vertically and precisely adjusted in relation to belt 32 and center rolls 30 of conveyor 10. Turning hand knob 144 while one or more hand knobs 132 are tight and engaged with lower bracket 122 will either result in no vertical movement or will result in slow or labored vertical movement that will provide immediate tactile feedback to the user about the condition of the various knobs 132. It will be appreciated that the desired leveling of roller 102 with belt 32 of conveyor 10 may be achieved by selectively adjusting each roller support 104 in the manner described.

Figure 4:
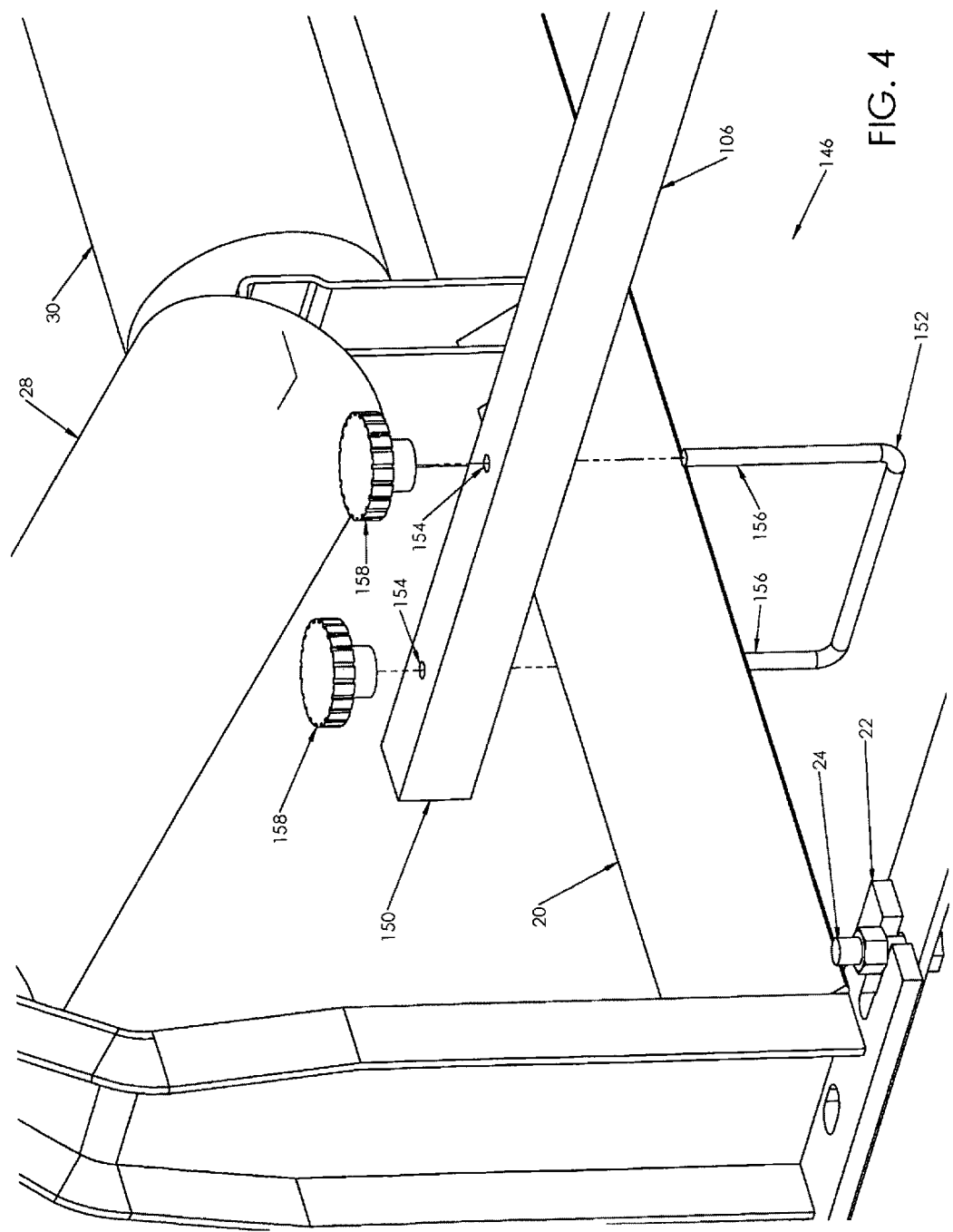
FIG. 4 is a partially exploded view of a portion of the weighing apparatus disclosed herein.

Turning to FIG. 4, each end 150 of cross member 106 preferably engages a transverse idler support 20 by way of a u-bolt 152. Opposite surfaces of cross member 106 are provided with corresponding apertures 154 through which externally threaded legs 156 of u-bolt 152 are passed. Once u-bolt 152 is in place, an internally threaded and hand-tightened locking nut 158 is placed over each leg 156 and tightened. While a u-bolt is depicted, other similar, non-invasive engagement means may be utilized.

As described herein, weighing apparatus 100 engages adjacent transverse idler supports 20 but does not require the modification of transverse idler supports 20, frame 14, idlers 12 or any other component of conveyor 10. "Modify" or "modification" in this context refers to the removal, movement, drilling, boring, cutting, sawing, severing or otherwise adjusting or physically changing components of conveyor 10. However, expressly excluded from the definition of modifications to conveyor 10 herein are adjustments to belt 32, including the lifting, moving aside or removal and replacement of belt 32, which will be understood by persons skilled in the art to occasionally be necessary or desirable to accommodate weighing apparatus 100.

Because of the ability to precisely adjust weighing apparatus 100 both vertically and horizontally, no idler shimming is required. Furthermore, in light of the use of the various hand knobs 112, 132, 144 and hand tightened locking nuts 158, no tools are required for the installation or removal of weighing apparatus 100 from conveyor 10.

Prior to installation of weighing apparatus 100, a conventional conveyor 10 is powered off and an installation location is determined. This location is preferably near the center of conveyor 10 and distal from loading and off-loading points to ensure optimal stability. Ends 150 of cross members 106 are preferably placed atop transverse idler supports 20 such that each cross member 106 engages at least two transverse idler supports 20 (one at each end) and such that roller 102 is situated between adjacent idlers 12. U-bolts 152 are looped around transverse idler supports 20 such that legs 156 are inserted upwardly through apertures 154 in cross member 106. Internally threaded locking nuts 158 are secured to externally threaded legs 156. This process is repeated as needed to ensure stability of weighing apparatus 100. Preferably, there are at least four such unions between u-bolts, transverse idler supports and cross members, one at each corner of the H-configured weighing apparatus 100.

Roller 102 is horizontally positioned relative to conveyor 10 by loosening hand knobs 112 and manually sliding sleeve 108 along cross member 106. Once roller 102 is in the desired horizontal location between and relative to idlers 12, hand knobs 112 are tightened.

Roller 102 is vertically positioned relative to belt 32 and center rolls 30 by first loosening hand knobs 132. Hand knob 144 is then rotated in either direction to cause roller 102 to be raised or lowered in relation to roller support 104. Once the desired vertical orientation of roller 102 relative to belt 32 is achieved, hand knobs 132 are tightened.

Roller 102 is also provided with a speed sensor 160 such as a proximity sensor. As is known in the art, a proximity sensor detects the presence of, for instance, a metal plug inserted into a roller in response to the movement of the conveyor belt. Sensor 160 may be located externally of roller 102, but is preferably contained within roller 102 such as described in U.S. Pat. No. 5,954,186 and commercially available as a Smart Roll™ (PRECISION PULLEY & IDLER, Pella, Iowa). Persons skilled in the art will appreciate that the c-shaped upper bracket 120 must provide sufficient clearance to accommodate one or more sensor cables 162 emerging from roller 102 when sensor 160 is integrated therein. A control box (not shown), in communication with sensor 160 via sensor cable 162, determines the speed of the conveyor based on the pulses, usually in terms of units length per units time.

A conventional, load cell enabled means (not shown) is provided to detect the amount of material passing along the conveyor belt via load cell 124. One such device is the Unitronics® Vision 130™ (UNITRONICS LTD. LLC, Israel). Such means is in communication with load cell 124 via load cell cable 164. The weighing apparatus described herein may or may not be certified such as for use in commerce or trade.

Figure 5:
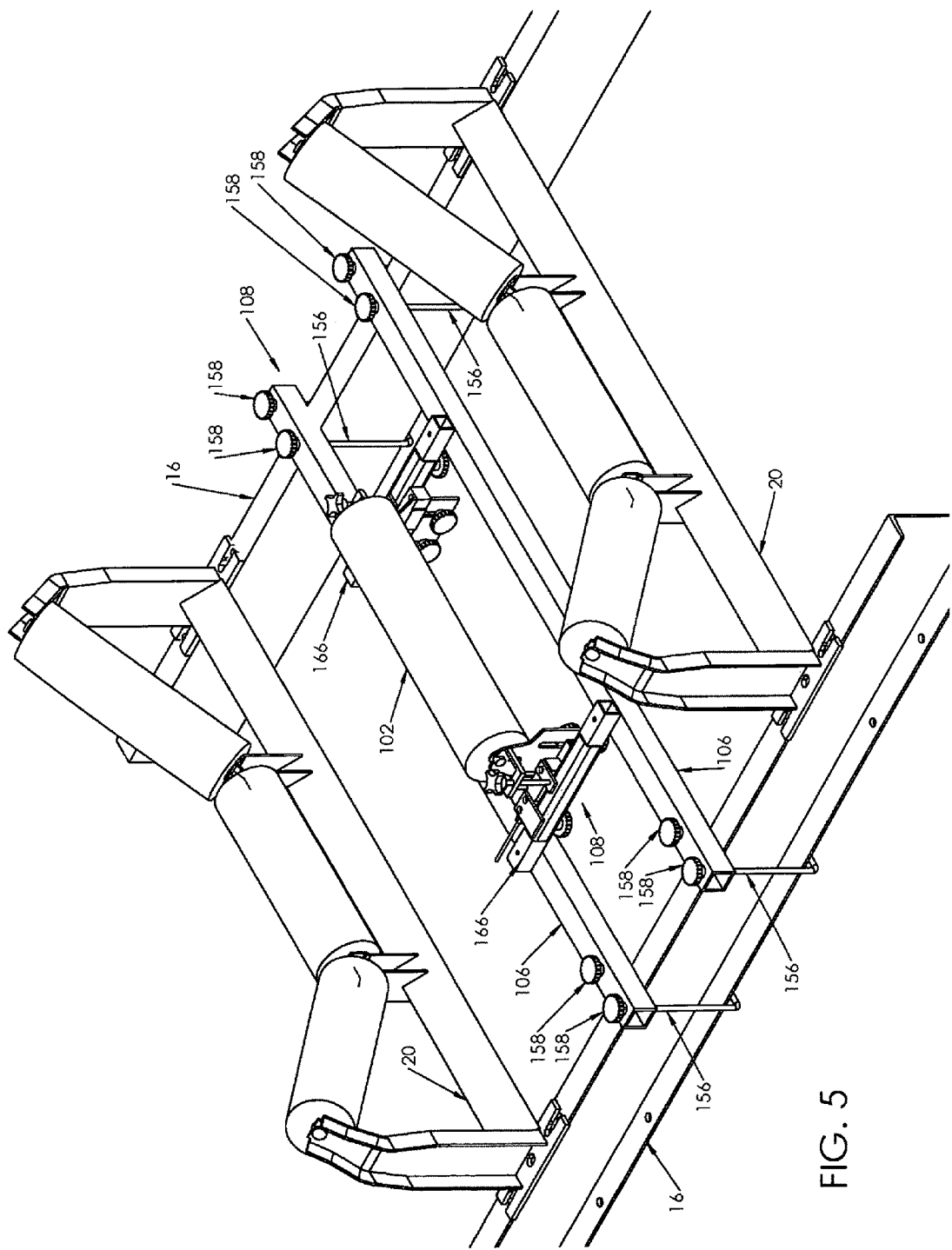
FIG. 5 is a perspective view of a partial conveyor fitted with an alternative embodiment of the weighing apparatus disclosed herein.

An alternative embodiment of weighing apparatus 100 is shown in FIG. 5. Roller 102 is again supported between adjacent idlers 12 by roller supports 104 and cross members 106, except that cross members 106 are substantially parallel to roller 102 and are substantially perpendicular to rails 16. Legs 156 of u-bolts 152 again pass upwardly through apertures 154 in ends 150 of cross members 106 and are likewise secured by locking nuts 158. However, u-bolts 152 fit about rails 16 instead of transverse idler supports 20. As in other embodiments, u-bolts are preferred but other, similar non-invasive means may be utilized. Sleeve 108 is slidably engaged about supplemental cross members 166. Supplemental cross members 166 traverse the space between cross members 106. Supplemental cross members 166 are substantially parallel to rails 16 and are secured at each end to cross members 106 as shown, such as by welding or other means known in the art.

Roller 102 is vertically and horizontally adjustable relative to conveyor 10 as described above, with the exception that sleeve 108 slidably engages and is horizontally adjustable about supplemental cross members 166 instead of cross members 106. It will be appreciated that in the embodiment illustrated in FIG. 5, horizontal adjustment of roller 102 is limited to the span of supplemental cross members 166 between cross members 106. Again, no modification to conveyor 10 is required in order to install, adjust or remove weighing apparatus 100.

Thus, the present invention has been described in an illustrative manner. It is to be understood that the terminology that has been used is intended to be in the nature of words of description rather than of limitation. Furthermore, whereas the present invention has been described in relation to the drawings attached hereto, it should be understood that other and further modifications, apart from those shown or suggested herein, may be made within the spirit and scope of this invention.

What we claim is:

1. A weighing apparatus for use in a conveyor having a belt and a plurality of idlers, each idler comprising a transverse idler support, and said conveyor supported on either side by a longitudinal frame, said weighing apparatus comprising:
    a roller adapted to be disposed between two of said idlers and further adapted to support a portion of said belt;
    a load cell operably connected to said roller;
    said roller supported by at least one vertical roller support and at least one cross member; and
    said at least one cross member adapted to be supported by said conveyor without modifying said conveyor.

2. The weighing apparatus of claim 1 further comprising a first hand knob, said roller being vertically adjustable about said at least one vertical roller support and relative to said belt using said first hand knob.

3. The weighing apparatus of claim 1 further comprising a second hand knob, said roller being horizontally adjustable about said at least one cross member and between and relative to said two idlers using said hand knob.

4. The weighing apparatus of claim 1 further comprising means for detecting rotation of said roller from contact with said belt.

5. The weighing apparatus of claim 4 wherein said means for detecting rotation is contained within said roller.

6. The weighing apparatus of claim 1 wherein said at least one cross member is adapted to be supported by said transverse idler support using non-invasive means.

7. The weighing apparatus of claim 1 wherein said at least one cross member is adapted to be supported by said longitudinal frame using non-invasive means.

8. A weighing apparatus for use in a conveyor having a belt and a plurality of spaced-apart idlers, each idler comprising a transverse idler support, and said conveyor supported on either side by a longitudinal frame, said weighing apparatus comprising:
- a flat roller adapted to be disposed between two of said idlers and further adapted to support a portion of said belt;
- said flat roller supported by a pair of vertical roller supports and a pair of cross members;
- said cross members adapted to be supported at each end by said conveyor without modifying said conveyor;
- said flat roller being vertically adjustable about said vertical roller supports and relative to said belt using a first hand knob;
- said vertical roller supports being horizontally adjustable about said cross members and between and relative to said two idlers using a second hand knob;
- means for detecting rotation of said roller from contact with said belt; and
- at least one load cell attached to said vertical roller support and adapted to detect the force resulting from the support of said belt by said roller.

9. The weighing apparatus of claim 8 wherein said cross members are substantially perpendicular to said roller and said ends of said cross members are adapted to be supported by said two idlers using non-invasive means.

10. The weighing apparatus of claim 8 wherein said cross members are substantially parallel to said roller and said ends of said cross members are adapted to be supported by said longitudinal frame using non-invasive means.

11. A method of attaching a weighing apparatus to a conveyor having a belt and a plurality of spaced-apart idlers, each idler comprising a transverse idler support, and said conveyor further supported on either side by a longitudinal frame, said method comprising the steps of:
- providing a weighing apparatus having a roller, a load cell, a vertical roller support and a cross member;
- securing said weighing member to said conveyor between two of said idlers without modifying said conveyor.

12. The method of claim 11 further comprising the step of vertically adjusting said roller about said vertical roller support and relative to said belt.

13. The method of claim 11 further comprising the step of horizontally adjusting said roller about said cross member between and relative to said two idlers.

14. The method of claim 11 wherein said cross member is secured to said transverse idler support using non-invasive means.

15. The method of claim 11 wherein said cross member is secured to said longitudinal frame using non-invasive means.

16. The method of claim 14 or 15 wherein said non-invasive means for securing said cross member is a u-bolt.

17. The method of claim 16 wherein said u-bolt is passed through apertures in said cross member and the ends of said u-bolt are externally threaded and secured with internally threaded and hand tightened locking nuts.

18. A method of attaching a weighing apparatus to a conveyor having a belt and a plurality of spaced-apart idlers, each idler comprising a transverse idler support, and said conveyor further supported on either side by a longitudinal frame, said method comprising the steps of:
- providing a weighing apparatus having a roller, a load cell, two vertical roller supports and two cross members;
- non-invasively securing corresponding ends of said cross members to said conveyor between two of said idlers and without modifying said conveyor;
- vertically adjusting said roller about said vertical roller supports and relative to said belt using a first plurality of hand knobs; and
- horizontally adjusting said roller about said cross members between and relative to said idlers using a second plurality of hand knobs.

19. The method of claim 18 wherein said ends of said cross members are secured to two of said transverse idler supports using a u-bolt.

20. The method of claim 18 wherein said ends of said cross members are secured to said longitudinal frame using a u-bolt.

* * * * *